(12) United States Patent  
Nakanishi et al.

(10) Patent No.: US 7,244,069 B2  
(45) Date of Patent: Jul. 17, 2007

(54) OPTICAL MODULE

(75) Inventors: Hiromi Nakanishi, Osaka (JP); Kenji Hirayama, Osaka (JP); Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/271,335

(22) Filed: Nov. 10, 2005

(65) Prior Publication Data

US 2006/0098925 A1    May 11, 2006

Related U.S. Application Data

(60) Provisional application No. 60/661,199, filed on Mar. 11, 2005.

(30) Foreign Application Priority Data

Nov. 11, 2004  (JP)  ............................. 2004-327843  
Jul. 25, 2005  (JP)  ............................. 2005-213587

(51) Int. Cl.  
*G02B 6/36*  (2006.01)

(52) U.S. Cl. ......................................... 385/93; 385/92

(58) Field of Classification Search ............ 385/88–94; 372/75, 703; 359/341  
See application file for complete search history.

(56) References Cited

U.S. PATENT DOCUMENTS

| | | | | |
|---|---|---|---|---|
| 5,040,863 A | * | 8/1991 | Kawakami et al. | 359/484 |
| 5,074,682 A | * | 12/1991 | Uno et al. | 385/93 |
| 5,195,155 A | * | 3/1993 | Shimaoka et al. | 385/90 |
| 5,978,535 A | * | 11/1999 | Mitsuda et al. | 385/88 |
| 6,071,016 A | * | 6/2000 | Ichino et al. | 385/92 |
| 6,872,012 B2 | * | 3/2005 | Watanabe | 385/94 |

FOREIGN PATENT DOCUMENTS

JP    2003-241025    8/2003

* cited by examiner

*Primary Examiner*—Tina M. Wong  
(74) *Attorney, Agent, or Firm*—Fish & Richardson P.C.

(57) ABSTRACT

A small Faraday rotator is placed in the inner space of a receptacle and a holder. Because the plane of polarization is rotated, even when backreflection light returns to a laser diode, the lasing state does not become unstable. Being placed in the inner space and fixed there, the Faraday rotator can be small and therefore does not increase the part cost notably. The assembly cost does not increase, because it is not required to tightly press-fit a member into a narrow hole.

10 Claims, 8 Drawing Sheets

FIRST EMBODIMENT

FIG. 1 FIRST EMBODIMENT

FIG. 2 SECOND EMBODIMENT

FIG. 3 THIR EMBODIMENT

FIG. 4 FOURTH EMBODIMENT

FIG. 8 THIS INVENTION

FIG. 9 THIS INVENTION

FIG. 10 FIFTH EMBODIMENT

FIG. 11 SIXTH EMBODIMENT

OPTICAL MODULE

CROSS REFERENCE TO RELATED APPLICATIONS

This application claims the benefit of priority of Japanese Application Nos. 2004-327843 filed Nov. 11, 2004 and 2005-231587 filed Jul. 25, 2005, and of U.S. Provisional Application No. 60/661,199 filed Mar. 11, 2005. The disclosures of the prior applications are considered part of and are incorporated by reference in the disclosure of this application.

BACKGROUND OF THE INVENTION

1. Field of the Invention

The present invention relates to a receptacle-type LD module.

2. Description of the Background Art

A receptacle-type optical module is a module that contains an LD or a PD in its package and that allows the attaching and detaching of a ferrule to which an optical fiber is attached. Furthermore, the module has a feature in which the plane of the package is orthogonal to the optical axis of the fiber, which is known as the perpendicular coupling. The module has so far been used widely. an LD module is provided with a laser diode (LD) in it. They have a receptacle-type structure in which a ferrule having an attached optical fiber can be connected to or disconnected from them. If light emitted from the laser diode is reflected to return to it, the operation of the laser diode becomes unstable, which is undesirable. in the case of the receptacle type, because the ferrule having an attached optical fiber is attached to or detached from the receptacle, the end portion of the optical fiber cannot be cut obliquely. The opposing faces are required to be perpendicular to the optical axis of the optical fiber. To solve the problem, a design is employed in which the receptacle is provided in it with a dummy fiber whose end is cut obliquely so that the light emitted from the LD can be obliquely reflected from the oblique end of the dummy fiber to prevent the light from returning to the laser diode. Such a design concept is employed in many types of receptacles, one of which has been disclosed in the patent literature 1, which is the published Japanese patent application Tokukai 2003-241025 entitled "Optical receptacle and optical module using it."

Figure 5:
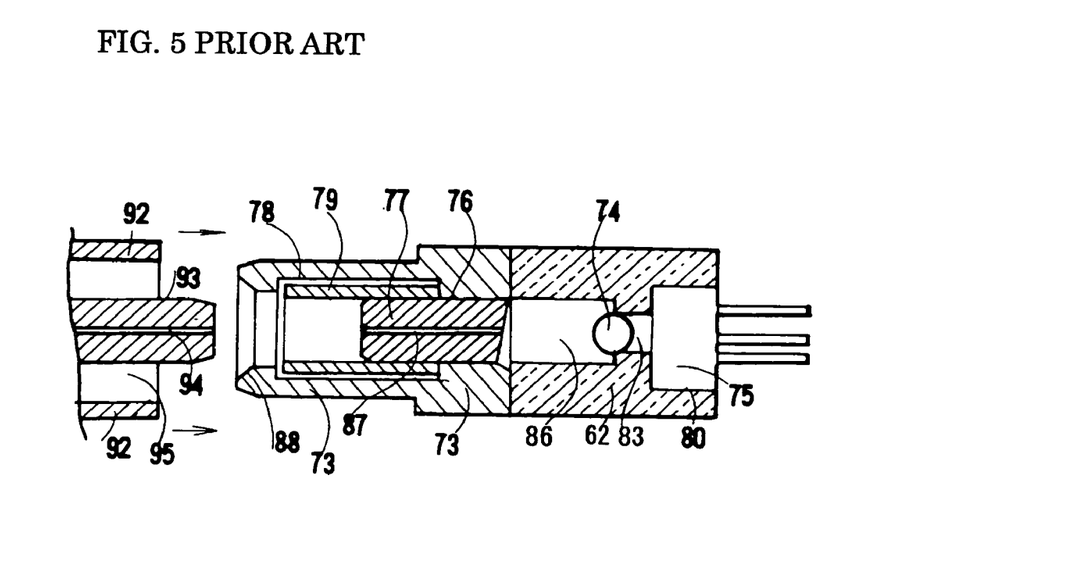
FIG. 5 is a longitudinal sectional view of a conventional optical module proposed by the published Japanese patent application Tokukai 2003-241025, in which an obliquely polished fiber stub is inserted into a receptacle so that an obliquely polished fiber can intervene between (a) a combination of an optical device and a lens and (b) an optical fiber, and consequently light is reflected obliquely, so that the backreflection light to the laser diode is suppressed.

As shown in FIG. 5, first, a sleeve 79 is inserted into a hole 78 of a top part of the receptacle 78. A stub 77 is prepared into which a dummy fiber 87 is inserted and the rear end of which is obliquely polished. The stub 77 is press-fitted into the bottom part of the receptacle 85. And then the top part of the receptacle 78 is press-fitted into the bottom part of the receptacle 85. The stub 77 is in contact with the receptacle 73 and the sleeve 79 through a contacting surface 76. A holder 62 has at its rear portion an optical-device-housing space 80 into which an LD (optical device) 75 is inserted to be fixed there. The holder 62 is provided at its middle portion with a lens-holding wall and a through hole 83. A spherical lens 74 is fixed at the front of the through hole 83. The LD 75 is placed at the rear of the through hole 83, so that the light of the LD passes through an inner space 86 to enter the dummy fiber 87. At this moment, the light reflected from the dummy fiber 87 is reflected at an oblique angle of 2Θ, which is two times the obliquely cut angle, Θ, of the stub 77. Consequently, it does not return to the laser diode 75. In this design, a ferrule 93 into which an outside optical fiber 94 is inserted can be attached to or detached from the receptacle 73. A front-end portion 88 of the receptacle 73 can be fitted into an internal space 95 of an outer cylindrical portion 92 of the ferrule 93 and be securely held there. The light having entered the dummy fiber 87 from the laser diode 75 enters the outside optical fiber 94 to be transmitted to the outside.

The above-described method in which an obliquely cut fiber prevents the backreflection light from returning to the laser diode is a conventional practice.

The mechanism for preventing the backreflection by utilizing the oblique reflection from the obliquely cut optical fiber is simple in structure and advantageous in that not many additional components are required. A number of proposals have been made for the oblique cutting. Some of them are put into actual use. Nevertheless, this technique still has some problems.

First, high dimensional precision is required because the obliquely cut stub 77 having the dummy fiber 87 is press-fitted into the hole 78 of the receptacle 73 and fixed there. It is necessary that the center of the sleeve 79 be coincident with that of the dummy fiber 87. Extremely high finishing precision is required for the hole 78 of the receptacle 73 and for the outer circumference of the sleeve 79. It seems that the hole 78 can be widened for the stub 77 to be fixed with an adhesive. However, this method is not desirable because the dummy fiber 87 tends to be displaced form the center of the axis.

Finishing work is required for the oblique cutting and polishing work of the end face of the stub 77. This additional process increases the part cost of the stub.

In addition, because the stub 77 into which the dummy fiber 87 is inserted is to be axially inserted into the receptacle 73, the longitudinal dimension of the receptacle 73 becomes large. This causes a problem of difficulty in miniaturization. Because the optical axis of the dummy fiber must be coincident with that of the attached fiber and the LD, the stub is required to have a length of a certain extent (about 2 mm or more) in order to secure the parallelism. Therefore, its longitudinal dimension cannot be decreased.

An LD has anisotropy in light emission. Consequently, if the direction of the oblique cutting is not coincident with that of the LD, the coupling efficiency varies. Therefore, it is necessary to assemble them while the intensity of the output light (efficiency) is being measured. This poses a problem in that the assembly work of the module becomes difficult.

Furthermore, the attaching and detaching of the optical fiber sometimes varies the coupling efficiency of the optical fiber, unstabilizing the attaching-and-detaching property.

SUMMARY OF THE INVENTION

In order to prevent the backreflection, the present invention causes the receptacle-type module to have a Faraday rotator, so that the Faraday rotator rotates the plane of polarization to prevent the reflected light from coupling with the light of the laser diode. A Faraday rotator has been in existence as a single device. It allows light to travel in one direction and prohibits light from transmitting in the other direction. It has been large in size and been an independent single device. A Faraday rotator has been used in various applications. For example, a single Faraday rotator part has been placed between optical connectors to block the back-reflection light. However, no small receptacle-type module containing optical fiber has been provided in part of it with a small Faraday rotator to prevent the backreflection light from returning to the laser.

The present invention rotates the plane of polarization of the light emitted from the LD by using a Faraday rotator and a permanent magnet so that the light reflected from the end face of the fiber cannot return to and couple with the laser diode. There are two instances of reflection: one is the reflection from the near end face (near end) of the fiber, and the other is the reflection from the far end face (far end) of the fiber. The present invention aims at eliminating both causes. While the operating current is small, the laser diode emits elliptically polarized light. When the current is increased, the emitted light becomes linearly polarized light. In other words, usually, the light emitted from the laser diode is close to linearly polarized light, which has a plane of polarization in a direction perpendicular to the chip. Its horizontal component is either zero or extremely small. The present invention also utilizes this characteristic. The plane parallel to the face of the laser diode chip is represented by the x and y coordinates. The direction perpendicular to the face of the chip is referred to as the z direction. The direction of the light beam propagation is represented by the x axis. The vector of the plane of polarization lies on the zy plane. The polarization direction of the laser diode is denoted as $\Upsilon$. This direction is usually parallel to the z axis. The rotation angle of the Faraday rotator is denoted as $\Phi$. The polarization direction of the light having returned to the laser diode after reflecting from the end face of the fiber is denoted as $\Xi$. Depending on the relationship between the Faraday rotator and the polarizer, the reflected light may or may not return to the laser diode. The backreflection light passes through the Faraday rotator twice: once at the forward direction, and once at the returning direction. Therefore, its plane of polarization has a rotation angle of $2\Phi$. In the case of the reflection from the near end of the fiber, the equation $\Upsilon+2\Phi=\Xi$ is obtained. In the case of the reflection from the far end of the fiber, the plane of polarization is sometimes rotated during the propagation over the optical fiber. In this case, when the rotation angle is denoted as $\eta$ for the forward direction and $\zeta$ for the returning direction, the equation $\Upsilon+2\Phi+\eta+\zeta=\Xi$ is obtained. However, $\eta$ and $\zeta$ depend on the type of the fiber and the stress applied to the fiber. Therefore, it should be considered that $\eta+\zeta$ takes a value on a random basis. In this case, $\Xi$ cannot be determined uniquely.

When only the near-end reflection is taken as the object of the consideration, the rotation angle $\Phi$ of the Faraday rotator is predetermined at 22.5 degrees, for example. When the light is reflected from the fiber end, the plane of polarization rotates by the same amount as above. That is, it rotates 45 degrees in total. While the operating current is small, the light of the LD is elliptically polarized light. When the current is increased, the light approaches linearly polarized light. The light has a principal plane of polarization in a direction perpendicular to the chip face, and it may also have a plane of polarization in a plane parallel to the chip face. Consequently, when a condition is provided in which the plane of polarization rotates 45 degrees in the forward and returning directions, i.e., $\Upsilon+45=\Xi$, it is possible to considerably suppress the coupling between the backreflection light and the lasing light of the laser diode. When the laser diode emits light close to linearly polarized light, $2\Theta$ may be predetermined at 40 to 140 degrees or so. In this case, the Faraday rotation angle becomes 20 to 70 degrees or so. When the plane of polarization is only Faraday-rotated, a device such as a sheet polarizer is not required.

The types of Faraday rotator include Bi-substituted rare-earth iron garnet, GdBi-substituted rare-earth iron garnet, and YFe garnet. Some Faraday rotator has high transmittance for a wavelength of 1.3 to 1.55 nm and a Verdet constant of V=3 deg/A or so. In order to obtain a rotation angle of 45 degrees, the required film thickness is 300 to 600 µm or so. The Faraday rotator can be inserted into the light-passing hole.

The permanent magnet gives the Faraday rotator an axial magnetic field, B, so that the Faraday rotator becomes capable of rotating the plane of polarization. The Faraday rotation angle $\Phi$ per unit length is proportional to the intensity of the magnetic field. The rotation angle $\Phi$ is given by the product of the length, H, of the Faraday rotator, the coefficient, F, of the Faraday rotation, and the intensity, B, of the magnetic field. Therefore, the equation $\Phi=HFB$ is obtained. In the above-described case, this value is predetermined at 22.5 degrees, for example. Even a value in the neighborhood of the foregoing value is effective. Consequently, the rotation angle may be predetermined at 20 to 45 degrees or so. When the laser diode emits linearly polarized light, the rotation angle may be 20 to 70 degrees. The light reflected from the near end face (near end) of the fiber has the same plane of polarization as that of the incident light. Therefore, the Faraday rotation angle is limited as described above. However, when the light reflected from the far end face (far end) of the fiber is taken as the object of the consideration, only the relationship between the polarizer and the Faraday rotator is the factor to be considered. Therefore, the range of the Faraday rotation angle can be determined freely without limitation. However, the relationship with the polarization direction by means of the polarizer is limited.

In addition, a self-magnetized-type Faraday rotator may also be used. In this case, the rotation angle $\Phi$ is determined by the thickness. No permanent magnet is required. Depending on the type, a rotation angle of 45 degrees requires a film thickness of 400 µm or so, for example. Consequently, it can either be inserted into the light-passing hole of the receptacle or be attached in the space of the lens holder.

The Faraday rotator may be combined with a sheet polarizer. As a small sheet polarizer, a glass polarizer having a thickness of 200 to 500 µm is available which is produced in such a way that silver halide particles or copper particles are dispersed in glass and the glass is drawn, so that the particles become oval and are arranged parallel to the direction of the longitudinal axis. The sheet polarizer is higher in cost than the Faraday rotator. Therefore, the incorporation of the sheet polarizer increases the cost. Nevertheless, when it is intended to more strictly suppress the reflected light from returning to the laser diode, the sheet polarizer is incorporated. In this case, the optimum Faraday rotation angle depends on the positional relationship between the sheet polarizer and the Faraday rotator. When the laser diode, the polarizer, the Faraday rotator, and the optical fiber are placed in this order, the polarization direction of the linearly polarized light of the laser diode is predetermined to be equal to the polarization direction, $\Gamma$, of the sheet polarizer ($\Upsilon=\Gamma$). Because the direction of the plane of polarization of the near-end-reflected light is $\Upsilon+2\Phi=\Xi$, it is most suitable to predetermine the Faraday rotation angle $\Phi$ at 45 degrees. Because the plane of polarization of the returning light is rotated by 90 degrees ($\Upsilon+2\Phi=\Xi$), the returning light cannot pass through the sheet polarizer. In actuality, because the laser diode has a linearly polarizing property, even the value of $\Phi$ in the range of 20 to 70 degrees or so can be effective.

In order to prevent the far-end-reflected light from returning, the laser diode, the Faraday rotator, the polarizer, and the optical fiber are placed in this order. It should be considered that the plane of polarization of the far-end-reflected light is randomly oriented. Therefore, it is meaningless to adjust the plane of polarization with the polarizer at the outset. However, in view of the fact that the polarization direction of the laser diode is denoted as $\Upsilon$ and the Faraday rotation $\Phi$ exists, it is desirable that the polarization direction $\Gamma$ of the sheet polarizer be predetermined by using the equation $\Upsilon+\Phi=\Gamma$. It is desirable to perform the following steps: (a) passing the returning light through the polarizer to obtain linearly polarized light and (b) rotating its plane of polarization by using the Faraday rotator such that the direction of the rotated plane of polarization $\Gamma+\Phi=\Xi$ is different from the direction of the linearly polarized light of the laser diode by 20 to 70 degrees. In this case, although the returning light exists, it does not couple with the lasing light of the laser diode. To avoid this coupling, the following relation should be satisfied: $\Upsilon-\Xi=\pm20$ to $\pm70$ degrees. When the light of the laser diode is completely linearly polarized light, the optimum value of the foregoing difference is 90 degrees. When it is elliptically polarized light, the optimum value of the foregoing difference is 45 degrees. When the sheet polarizer is placed as described above, the slanting angle of the returning light against the polarized light of the laser diode becomes $\Upsilon-\Xi=-2\Phi$. As a result, for the linearly polarized light, the optimum value of $\Phi$ is 45 degrees, and for the elliptically polarized light, it is 22.5 degrees.

Alternatively, the imaginary line connecting the lens, Faraday rotator, and optical fiber is predetermined to be inclined 1 to 3 degrees or so toward the optical axis of the LD. This arrangement can also decrease the backreflection. The reason is that because the light reflected from the near end does not pass through the center point of the lens, it does not return to the laser diode. On the other hand, the light reflected from the far end travels over the fiber in the returning direction. However, the presence of the lens prevents the light from returning to the height of the light-emitting portion (active layer) of the laser diode.

The present invention relates to an optical module that comprises (a) a receptacle that allows the attaching and detaching of a ferrule of an outside optical fiber and (b) a holder containing an optical device. In the foregoing module, the present invention provides a Faraday rotator in an inner space of the holder to rotate the plane of polarization. This provision prevents the backreflection light from returning to the optical device to intermingle with the exciting light. As a result, the laser diode can be operated without unstability.

In comparison with a conventional module in which an obliquely cut fiber stub is press-fitted into a hole of the receptacle, the present invention eliminates the necessity of the finishing work of the hole of the receptacle and the stub. Consequently, high machining precision is not required. The easy machining can reduce the cost. The absence of the stub reduces the part cost accordingly.

Because it is not necessary to increase the length of the hole of the receptacle to house the stub, the receptacle can be shortened. Thus, the size of the module can be reduced. When the stub is inserted into the hole of the receptacle, in order to increase the coupling with the laser diode, it has been necessary to rotate the stub to place it at a proper position. On the other hand, the present invention eliminates the use of the fiber stub. As a result, it is not necessary to pay attention to the direction, and the centering with regard to the rotation direction is not required.

Nevertheless, when the size reduction of the module and the cost are disregarded, a structure may be employed in which (a) a fiber stub having an optical fiber at its center is housed in the hole of the receptacle and (b) a Faraday rotator is placed between the fiber stub and the condenser lens. This is a structure for doubly preventing the backreflection. In this case, the provision of the fiber stub increases the time and effort for the centering. Nevertheless, it can more strictly prevent the backreflection.

Figure 6:
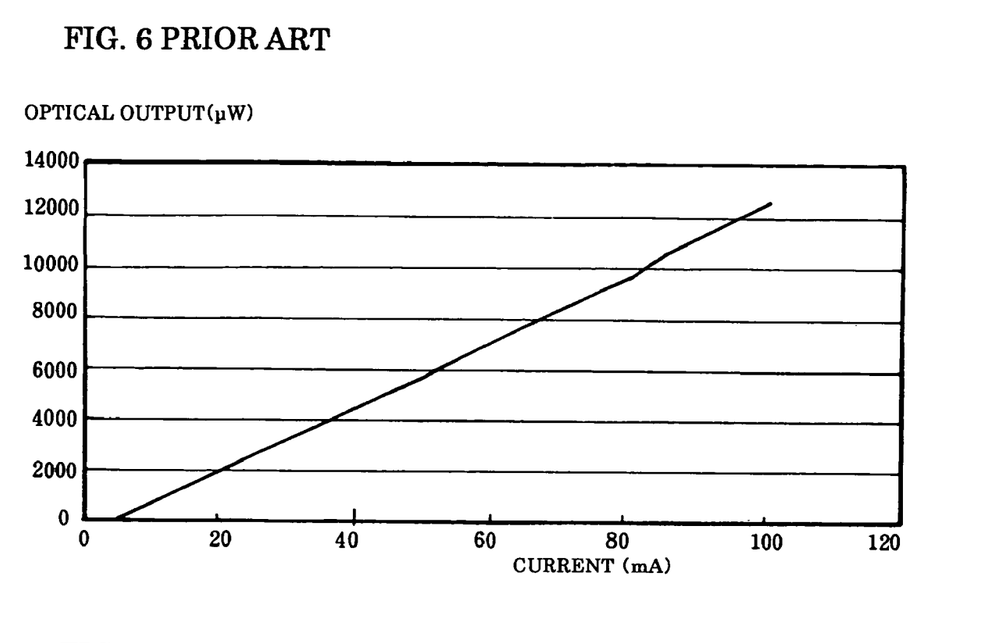
FIG. 6 is a graph showing a property of a conventional optical module that uses a laser diode as the light-emitting device and that has no Faraday rotator, the property being a relationship between the operating current of the laser diode and the optical output, in which graph the horizontal axis represents the operating current (mA) of the laser diode and the vertical axis represents the optical output (μW) measured by a detector placed at the far end of the outside optical fiber to measure the power of the light having traveled over the optical fiber.

FIG. 6 is a graph showing a property of an optical module that uses a laser diode as the light-emitting device and that has no Faraday rotator. The property shown is a relationship between the operating current of the laser diode and the optical output. The horizontal axis represents the operating current (mA) of the laser diode, and the vertical axis represents the optical output ($\mu$W) measured by a detector placed at the far end of the outside optical fiber to measure the power of the light having traveled over the optical fiber. The lasing occurs at a current of about 6 mA or more. The optical output increases in proportion to the increase in the current. However, the relationship is not completely linear, and some fluctuation can be seen. In particular, when the operating current increases to 50 mA or more, it is obvious that the increase in the optical output fluctuates.

Figure 7:
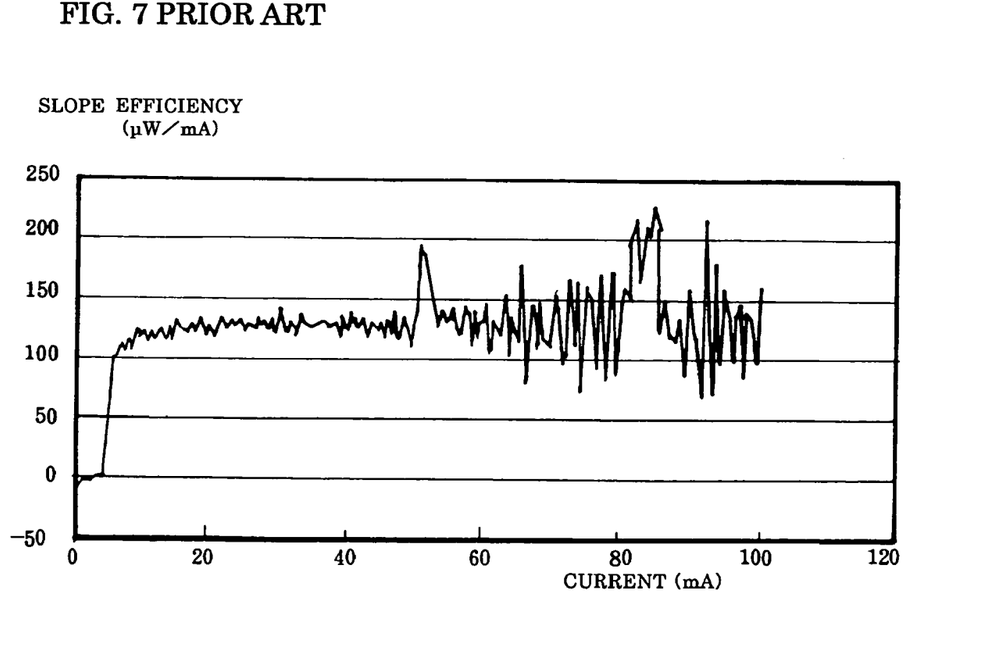
FIG. 7 is a graph showing a property of a conventional optical module that uses a laser diode as the light-emitting device and that has no Faraday rotator, the property being a slope efficiency, which is obtained by differentiating the optical output, Q, with the operating current, J.

FIG. 7 is a graph showing the slope efficiency obtained by differentiating the optical output, Q, with the operating current, J. The differentiation (dQ/dJ) is performed to further clarify the fluctuation in the relationship between the current and optical output. When the current is between 10 mA and 100 mA, the differentiated result is about 120 $\mu$W/mA. However, when the current is 50 mA or more, the result largely fluctuates between 80 $\mu$W/mA and 230 $\mu$W/mA. The differentiated result significantly varies with a small variation in the current, clearly showing that the operation of the laser diode becomes unstable. For example, in the range of 20 mA in the operating current from 60 to 80 mA, the number of variations in the optical output in excess of 20 $\mu$W/mA is 25 times. The summation of the width of the variation is 300 $\mu$W/mA.

Figure 8:
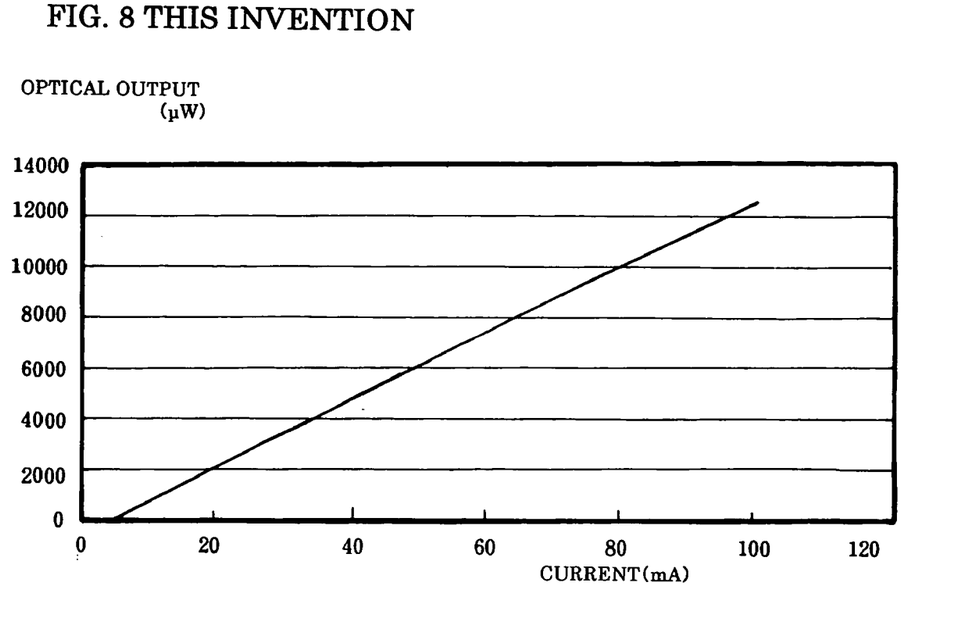
FIG. 8 is a graph showing a property of an optical module in a first embodiment of the present invention, the property being a relationship between the operating current of the laser diode used as the optical device and the optical output measured at the far end of the outside optical fiber, in which graph the horizontal axis represents the operating current J (mA) and the vertical axis represents the optical output (μW).

FIG. 8 is a graph showing a property of an optical module in a first embodiment of the present invention. The property shown is a relationship between the operating current of the laser diode used as the optical device and the optical output measured at the far end of the outside optical fiber. The horizontal axis represents the operating current J (mA), and the vertical axis represents the optical output. The graph shows that the lasing occurs at about 6 mA and beyond that a good linear relationship is maintained between the current and the optical output.

Figure 9:
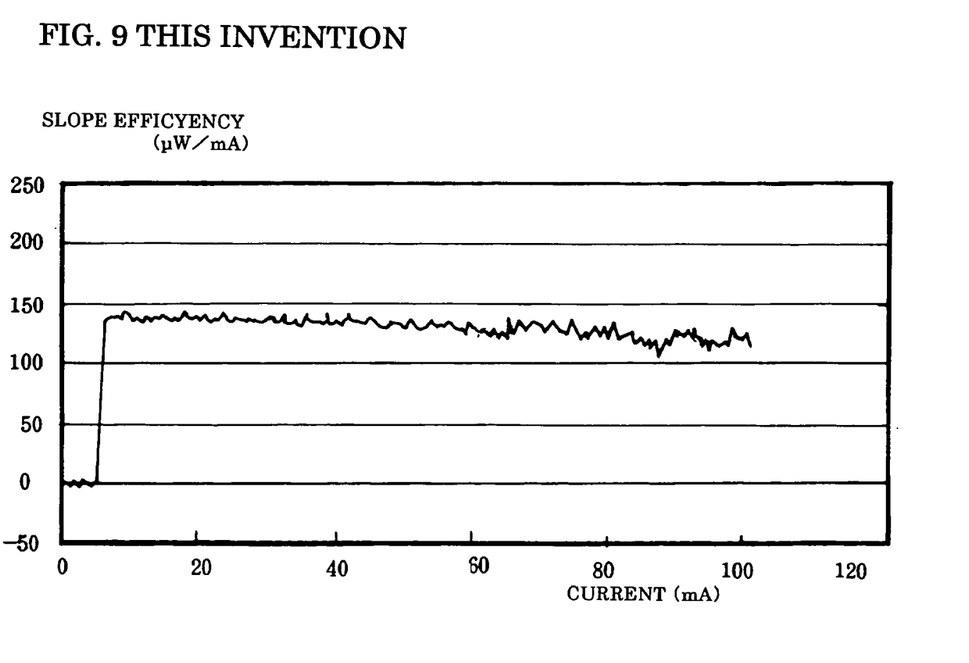
FIG. 9 is a graph showing a property of an optical module in the first embodiment of the present invention, the property being the differentiated result using the relationship between the current and the optical output, in which graph the horizontal axis represents the current (mA) and the vertical axis represents the slope efficiency, i.e., dQ/dJ (μW/mA).

FIG. 9 is the differentiated result using the relationship between the current and the optical output shown in FIG. 8. The horizontal axis represents the current (mA), and the vertical axis represents the slope efficiency, i.e., dQ/dJ ($\mu$W/mA). In a wide range of the operating current from 10 to 100 mA, the efficiency dQ/dJ is nearly constant at 130 $\mu$W/mA or so. In the range of 20 mA from 60 to 80 mA, the number of variations in the optical output in excess of 20 $\mu$W/mA is zero. The summation of the width of the variation is about 60 $\mu$W/mA. In comparison with the conventional module having no Faraday rotator whose result is shown in FIG. 7, it can be seen that the lasing is exceedingly stable.

DETAILED DESCRIPTION OF THE INVENTION

Although the internal structure is not shown, the optical device is a device in which a laser diode and a monitoring PD are mounted on a package through a submount. The structure allows the monochromatic light of the laser diode to exit from a front window. The lead pins are divided into two types: one for supplying the operating current to the laser diode, and the other for drawing out the output current of the monitoring PD.

The laser diode is made of a material based on either InGaAsP or AlInGaAs. It emits monochromatic light having any of the wavelengths from 1.3 to 1.55 μm.

The submount for the laser diode is made of a material based on either AlN or $Al_2O_3$.

The monitoring PD is made of a material based on either InGaAs or InGaAsP (the substrate is an InP substrate for both cases). It has a sensitivity up to 1.6 μm in wavelength and monitors the backward light emitted from the laser diode.

The package is made of a material such as iron, Kovar, or copper, and its surface is gold-plated.

The cap is made of a stainless-steel-based material and is provided with a spherical lens at its center. It is welded to the package with a resistance welder in an $N_2$ atmosphere to form hermetic sealing.

The spherical lens is made of BK7. It has a spherical shape with a diameter of 0.8 mm. It is securely held by the cap through low-melting-point glass.

The receptacle portion is a metallic member called a precision sleeve made of stainless steel.

The receptacle portion is provided with a hole having a diameter of 1.250 mm+0.001 mm/–0 mm. The hole is for inserting into it a ferrule holding an optical fiber.

In this example, the receptacle portion is produced with a metallic member. However, it is not limited to metal. In order to further enhance the wear resistance, a binary structure may be employed in which a metallic member is combined with ceramic such as zirconia.

The receptacle is provided at its center with a light-passing through hole. A Faraday rotator is bonded at that place and fixed there. As the adhesive, an epoxy-based adhesive is used.

The Faraday rotator is made of a single crystal of Bi-substituted rare-earth iron garnet, a single crystal of GdBi-substituted rare-earth iron garnet, or a single crystal of YFe garnet, for example. Because the light beam is not concentrated at the optical-device-side face of the Faraday rotator, the reflection is low at this face. Nevertheless, the optical-device-side face is coated with an antireflection coating (AR coating).

The light emitted from the laser diode passes through the Faraday rotator, rotating its state of polarization. The light reflected from the end face of the optical fiber again rotates its state of polarization in the Faraday rotator. At this moment, when the direction of the plane of polarization is not coincident with the active layer of the laser diode (LD), the backreflection is suppressed.

The insertion of the Faraday rotator has improved the relative intensity noise (level of backreflection) from –120 to –130 dB/Hz. In comparison with a conventional combination of a stub and a press-fitted sleeve, the Faraday-rotator-bonding structure has reduced the cost.

FIRST EMBODIMENT

Combination of Faraday Rotator and Permanent Magnet

Figure 1:
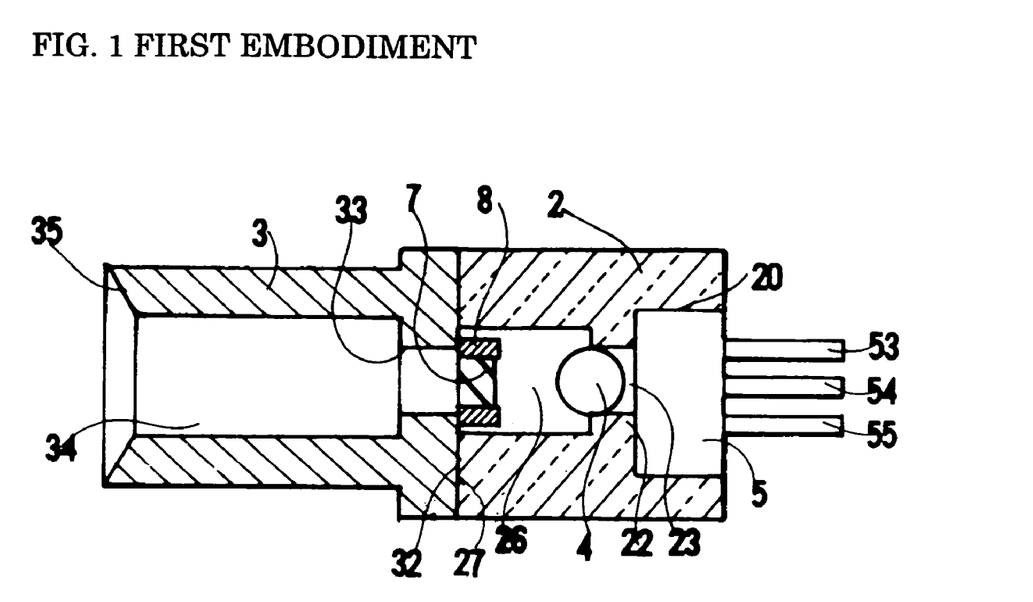
FIG. 1 is a longitudinal sectional view of an optical module in a first embodiment of the present invention, in which the backreflection is suppressed by placing a permanent magnet and a Faraday rotator at a position directly facing a hole of a receptacle so that the Faraday rotator can intervene between (a) a combination of an optical device and a lens and (b) an optical fiber.

An optical module in a first embodiment of the present invention is described below by referring to FIG. 1. The optical module comprises a cylindrical holder 2, a cylindrical receptacle 3 adjacent to the holder 2, an optical device 5 housed in the holder 2, and a small Faraday rotator 7 fixed on the rear wall of the receptacle 3.

The optical device 5 is inserted into a optical-device-housing space 20 at the rear of the holder 2 and is fixed there. The holder 2 is provided with a lens-holding wall 22 at its middle portion. A through hole 23 passes through the wall 22 at its center. A spherical lens 4 is fixed at the front of the through hole 23. The front end of the holder 2 forms a smooth holder front face 27.

Figure 12:
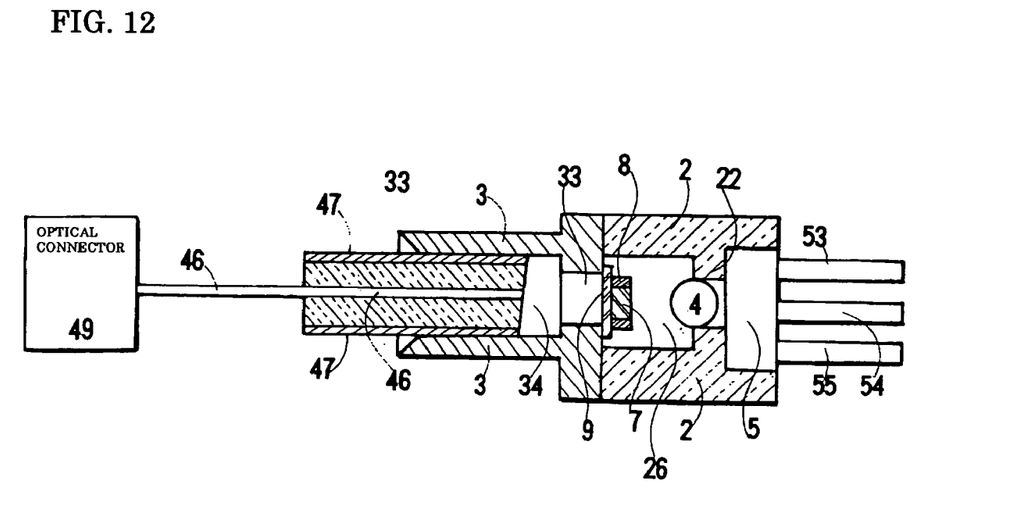
FIG. 12 is a longitudinal sectional view of a combination of a ferrule attached to a receptacle in an embodiment of the present invention on a detachable basis, an outside optical fiber, and an optical connector connected to the outside optical fiber.

The receptacle 3 is provided at its rear with a wider receptacle rear face 32. The receptacle rear face 32 is welded with the holder front face 27 of the holder 2. The receptacle 3 is provided at its front portion with a cylindrical ferrule-holding hole 34 that allows a ferrule to be inserted into it and held there. The receptacle 3 is provided at its front with a chamfer 35 to facilitate the attaching and detaching of the ferrule. As shown in FIG. 12, this structure allows a ferrule 47 having an outside optical fiber 46 inserted into it to be attached into or detached from the ferrule-holding hole 34. In this example, the ferrule-holding hole 34 has a diameter of 1.250 mm. The ferrule 47 is fixed by inserting its front portion into the ferrule-holding hole 34 of the receptacle 3. The ferrule 47's end face (receptacle-side face) to be inserted into the ferrule-holding hole 34 is obliquely polished. The other end of the outside optical fiber 46 is connected to an optical connector 49.

A combination of the Faraday rotator 7 and a permanent magnet 8 is positioned directly at the rear side of a light-passing hole 33 provided at the rear-end portion of the receptacle 3. The optical-device-side face of the Faraday rotator 7 is provided with an antireflection film. If the light passing through an inner space 26 of the holder reflects and returns to the laser diode, the laser diode is also adversely affected. To prevent this phenomenon, the antireflection film is provided.

The Faraday rotator is a small device, and the Faraday rotation angle, $\Phi$, is given by a product of a Verdet constant, V, a flux density, B, and a length, H, i.e., BVH. In this case, the magnetic field of the permanent magnet 8 and the length of the Faraday rotator 7 are predetermined so that the Faraday rotation angle can become 22.5 degrees. Because a Faraday rotator having a large Verdet constant becomes available, it becomes possible to miniaturize the Faraday rotator. The Faraday rotator can be produced by using a single crystal of Bi-substituted rare-earth iron garnet as the material, for example. The permanent magnet is an axially magnetized cylindrical magnet. The magnet is used to form the flux density B that is axially oriented in the vicinity of the center of the Faraday rotator.

The optical device 5 is provided with a cylindrical stem and pins 53, 54, and 55 that extend toward the rear. The device houses in it a laser diode chip or a photodiode chip and has a structure in which the entire device is covered with a package. The optical device 5 is a device such as a laser diode or a photodiode. Whichever of a light-emitting device or a photodetection device is used, a laser diode is placed at either side of the optical fiber. Therefore, it is necessary to prevent the backreflection without regard to the type of the device. In the case of a photodetection device, a laser diode is placed at the far end of the outside optical fiber. When the light emitted from the laser diode have traveled over the optical fiber, the light may be reflected at the light-entering face of the photodetection device of this optical module. When this occurs, the reflected light may travel over the optical fiber again to return to the laser diode. If the light reflected from the face of the photodetection device returns to the laser diode, the operation of the laser diode becomes unstable. Therefore, whichever of a light-emitting device or a photodetection device is used as the optical device, a similar problem may come up. It is easy to understand the phenomenon when a laser diode is used as the optical device, because this model is straightforward. Consequently, an explanation is given below on the system where a laser diode is used as the optical device 5.

The light emitted from the laser diode is not circularly polarized light. Instead, light having a plane of polarization perpendicular to the stripe is predominant. In other words, it is close to linearly polarized light. The light is gathered by the spherical lens 4 and enters the optical fiber 46 in the inserted ferrule 47 (see FIG. 12). In this case, some components of the light are reflected from the end face of the optical fiber 46. When the linearly polarized light is reflected and returns through the same route, it enters the laser diode 5 to become the backreflection light. When this occurs, the lasing state of the laser diode is disturbed, posing a problem.

According to the present invention, the Faraday rotator 7 is placed between the laser diode 5 and the optical fiber 46.

Consequently, the polarization of the reflected light is different from that of the emitted light. As a result, even when the reflected light returns to the resonator of the laser diode, the lasing state does not become unstable.

The ideal condition is that the light of the laser diode is completely linearly polarized light. In this case, when the light is rotated 45 degrees with the Faraday rotator, the light is rotated 90 degrees when it returns to the laser diode. Therefore, its plane of polarization becomes perpendicular to that in the laser diode, thereby completely eliminating the relationship with the laser diode.

However, the actual fact is different. The light emitted from the laser diode has both polarized light, G, perpendicular to the stripe and weak polarized light, H, parallel to the stripe. In the first embodiment of the present invention, the Faraday rotator is placed that rotates the plane of polarization 22.5 degrees. Because the plane of polarization is rotated 45 degrees in total in the forward and returning directions, the polarized light G in the perpendicular direction becomes polarized light having an orientation of 45 degrees (E direction). The polarized light E has an orientation different from that of the polarized light G and the polarized light H. Therefore, it has almost no coupling with them. The polarized light H in the parallel direction becomes polarized light having an orientation rotated 45 degrees from the original orientation (the new direction is the F direction). The polarized light F has an orientation different from that of the polarized light G and the polarized light H. Therefore, it has almost no coupling with them. As a result, the lasing state of the laser diode remains stable. The insertion of the Faraday rotator has reduced the relative intensity noise (RIN) from −120 to −130 dB/Hz.

Actually, the backreflection light is not completely blocked. A minute part of it returns to the laser diode. Its plane of polarization is not oriented exactly at 90 degrees. Therefore, there exists a slight coupling. Nevertheless, because the gain of the laser diode is not very high, the backreflection light does not either produce parasitic oscillations or generate a kink (a bent-line portion) in the current-light emission curve.

Because the laser diode is used for optical communication, it is an InGaAsP- or AlInGaAs-based laser diode. It emits light having a wavelength of 1.3 to 1.55 µm. The laser diode is mounted on a submount made of an insulator such as AlN and fixed on a pole (not shown) of a stem. A monitoring photodiode (PD: not shown) is placed directly under the laser diode. The monitoring photodiode sensitively receives the backward light of the laser diode to maintain the output level of the laser diode constant. The cylindrical package outside the laser diode 5 is formed by using a material such as iron, Kovar, or copper, and its surface is gold-plated.

The holder 2 is made of stainless steel. The lens fixed on the lens-holding wall 22 of the holder 2 is made of Bk7 glass. It has a diameter of 0.8 mm. It is securely held by the wall of the holder through low-melting-point glass. An antireflection film is formed on the surface of the lens 4.

The receptacle 3 is made of stainless steel. Although the receptacle is metallic, to improve the wear resistance, a binary structure may be employed in which ceramic such as zirconia is combined.

A combination of the Faraday rotator 7 and the permanent magnet 8 is fixed by using an adhesive on the receptacle 3's wall at the rear side of the light-passing hole 33. As the adhesive, an epoxy adhesive may be used, for example.

The receptacle rear face 32 of the receptacle 3 and the holder front face 27 of the holder 2 are centered with each other to obtain the optimum position. The two members are welded at that position to unify the holder and the receptacle.

The Faraday rotator is attached on the receptacle's wall at the rear side of the light-passing hole to prevent the reflected light from returning to the laser diode. The system is entirely different from the approach as shown in FIG. 5, in which an obliquely cut stub and dummy fiber is inserted into the receptacle. The structure in which an obliquely cut stub is press-fitted into the ferrule-holding hole of the receptacle requires high machining precision for the stub and receptacle, thereby rendering the assembly work difficult.

On the other hand, the present invention entirely eliminates the necessity of the obliquely cut face. Consequently, it is not necessary to use the stub 77 and the dummy fiber 87 shown in FIG. 5 for the prior art. The press-fitting step is also not required. The present invention eliminates such a difficulty. The Faraday rotator and permanent magnet are newly required components. Their parts cost must be included. However, a low-cost Faraday rotator having a high Verdet constant is available. A small, low-cost permanent magnet having a high flux density is also available. Therefore, the increase in the parts cost is not notably high.

SECOND EMBODIMENT

Self-magnetized-type Faraday Rotator

Figure 2:
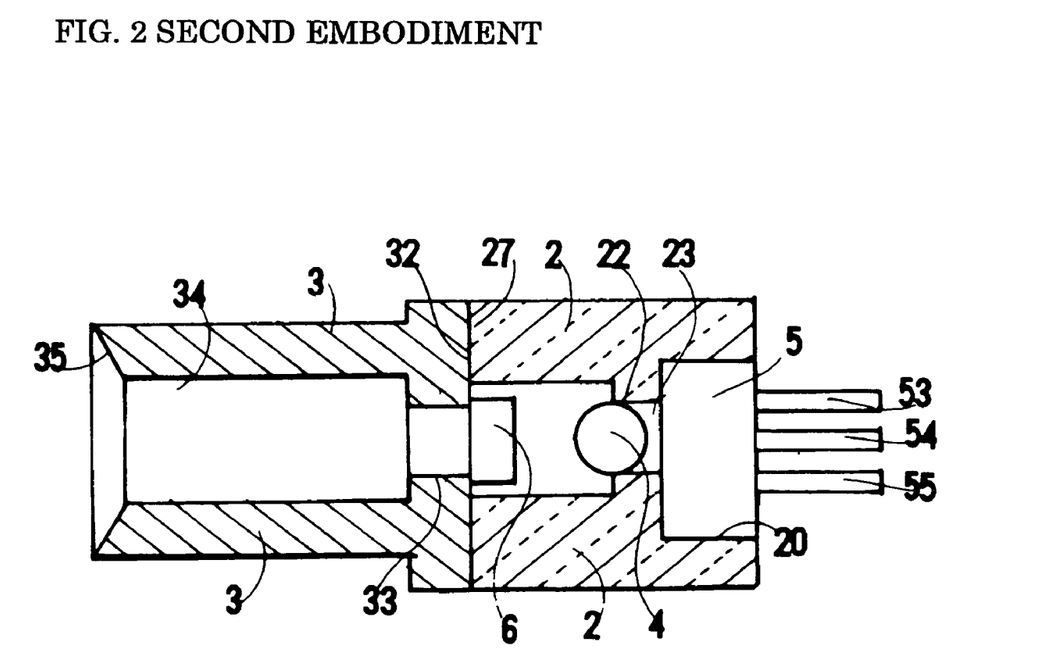
FIG. 2 is a longitudinal sectional view of an optical module in a second embodiment of the present invention, in which the backreflection is suppressed by placing a self-magnetized-type Faraday rotator at a position directly facing a hole of a receptacle so that the Faraday rotator can intervene between (a) a combination of an optical device and a lens and (b) an optical fiber.

An optical module in a second embodiment of the present invention is described below by referring to FIG. 2. This optical module also has nearly the same structure as that in the first embodiment. The optical module comprises a cylindrical holder 2, a cylindrical receptacle 3 adjacent to the holder 2, an optical device 5 housed in the holder 2, and a small self-magnetized-type Faraday rotator 6 fixed on the rear wall of the receptacle 3. Whereas the first embodiment uses a combination of the permanent magnet 8 and the Faraday rotator 7, the combination is replaced with the self-magnetized-type Faraday rotator in this embodiment. The self-magnetized-type Faraday rotator is a device that can produce the Faraday rotation without the use of a permanent magnet. Because this device can eliminate the use of the permanent magnet, the number of parts can be decreased. It also produces a spatial margin.

The following explanation can be applied to both the first and second embodiments. The Faraday rotation angle may be about 22.5 degrees or so instead of 45 degrees. Therefore, the Faraday rotator can have a length about half the length of the one that is required to rotate 45 degrees. In other words, it is suitable for the miniaturization. The light is gathered with the lens 4. The light-gathered point lies at the tip of the optical fiber, which is located somewhere at one point in the ferrule-holding hole 34 of the receptacle 3. Consequently, the light beam passing through the Faraday rotator 7 or 6 is spread, not gathered. Therefore, the reflection is low. Nevertheless, the lens-side face of the Faraday rotator is coated with an antireflection film (AR coating). Therefore, no reflection occurs at the laser-diode-side face of the Faraday rotator. Even when reflection occurs at the ferrule-side face of the Faraday rotator, the reflected light is subjected to the Faraday rotation and does not couple with the laser diode.

THIRD EMBODIMENT

Combination of Faraday Rotator, Permanent Magnet, and Sheet Polarizer

Figure 3:
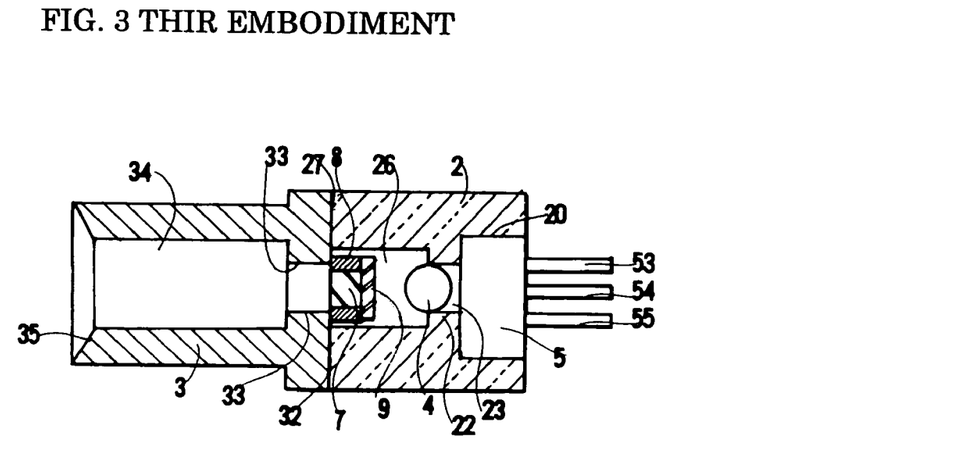
FIG. 3 is a longitudinal sectional view of an optical module in a third embodiment of the present invention, in which the backreflection is suppressed by placing a permanent magnet, a Faraday rotator, and a sheet polarizer at a position directly facing a hole of a receptacle so that the Faraday rotator can intervene between (a) a combination of an optical device and a lens and (b) an optical fiber.

An optical module in a third embodiment of the present invention is described below by referring to FIG. 3. This optical module also has nearly the same structure as that in the first and second embodiments. The optical module comprises a cylindrical holder 2, a cylindrical receptacle 3 adjacent to the holder 2, an optical device 5 housed in the holder 2, and a combination of a Faraday rotator 7, a permanent magnet 8, and a sheet polarizer 9, which combination is fixed on the rear wall of the receptacle 3. The optical components are placed in the following order: the laser diode, sheet polarizer, Faraday rotator, and optical fiber.

Whereas the first embodiment uses a combination of the permanent magnet 8 and the Faraday rotator 7, the sheet polarizer 9 is added to the combination in this embodiment. The sheet polarizer 9 is a sheet that has a function of selectively transmitting only the light having a certain direction in its polarized state. The light emitted from the laser diode is not completely linearly polarized light. However, the placing of the sheet polarizer can transform the light into completely linearly polarized light.

The plane of polarization of the light transformed into linearly polarized light is rotated with the Faraday rotator. After passing through the Faraday rotator, the light hits the opposing optical fiber, and some part of it is reflected there to return. The plane of polarization of the returning light is rotated again by the same amount with the Faraday rotator. In total, the plane of polarization is rotated by an amount that is two times the Faraday rotation angle $\Phi$, i.e., $2\Phi$. Because of the presence of the sheet polarizer, only the polarized light having the same orientation passes through it. The intensity of the light is decreased to an amount proportional to $\cos 2\Phi$. When the condition $\Phi=45$ degrees is established, the amount of light passing through the sheet polarizer can be decreased to zero. Therefore, in this embodiment, it is desirable that the Faraday rotation angle $\Phi$ be predetermined at 45 degrees. Nevertheless, even with a rotation angle, $\Phi$, of 20 to 70 degrees, the backreflection can be suppressed sufficiently.

FOURTH EMBODIMENT

Figure 4:
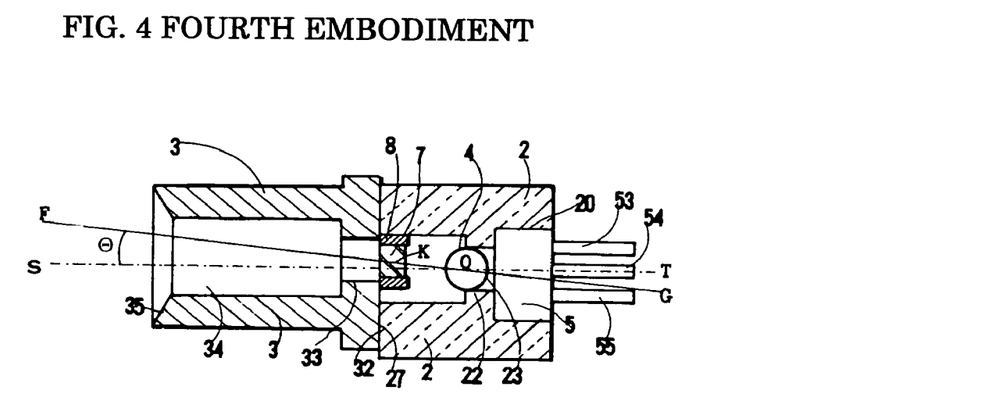
FIG. 4 is a longitudinal sectional view of an optical module in a fourth embodiment of the present invention, in which the backreflection is suppressed both by placing a permanent magnet and a Faraday rotator at a position directly facing a hole of a receptacle so that the Faraday rotator can intervene between (a) a combination of an optical device and a lens and (b) an optical fiber and by displacing the optical axis of the receptacle from that of the optical device and lens.

Combination of Faraday Rotator and Permanent Magnet, Plus Off-axis Arrangement FIG. 4 shows a fourth embodiment of the present invention. In this embodiment, the axis of the module shown in the first embodiment is displaced. The axis of the holder 2 is not coincident with that of the receptacle 3. The receptacle 3 is displaced in a direction perpendicular to the axis. The Faraday rotator 7 and the permanent magnet 8 are fixed on the rear face of the receptacle 3 such that their axis is coincident with that of the light-passing hole 33. However, the receptacle 3 is in an off-axis position against the holder 2. As a result, a line, GOF, connecting the center of the light-passing hole 33 and the center, O, of the lens 4 forms a tilt angle, $\Theta$, with the axial line, ST, of the optical device 5 and the holder 2.

When the ferrule with the outside optical fiber is inserted into the ferrule-holding hole 34 of the receptacle 3, the light beam emitted from the laser diode proceeds in a slanting direction and hits upon the end of the fiber at the tilt angle $\Theta$. When the angle $\Theta$ is smaller than $\theta$ determined by $\sin \theta$, which is obtained from the numerical aperture, the light enters the optical fiber. The light reflected from the end face is reflected in a direction at an angle of $2\Theta$. Almost no reflected light returns to the Faraday rotator 7. Even when part of the reflected light returns, it is refracted by the lens 4, so that it cannot return to the laser diode. This embodiment combines the backreflection-blocking effect by means of the off-axis arrangement and the backreflection-suppressing effect by the use of the Faraday rotator. Although the coupling efficiency between the laser diode and optical fiber is decreased, this system is more effective with respect to the suppression of the backreflection.

FIFTH EMBODIMENT

Figure 10:
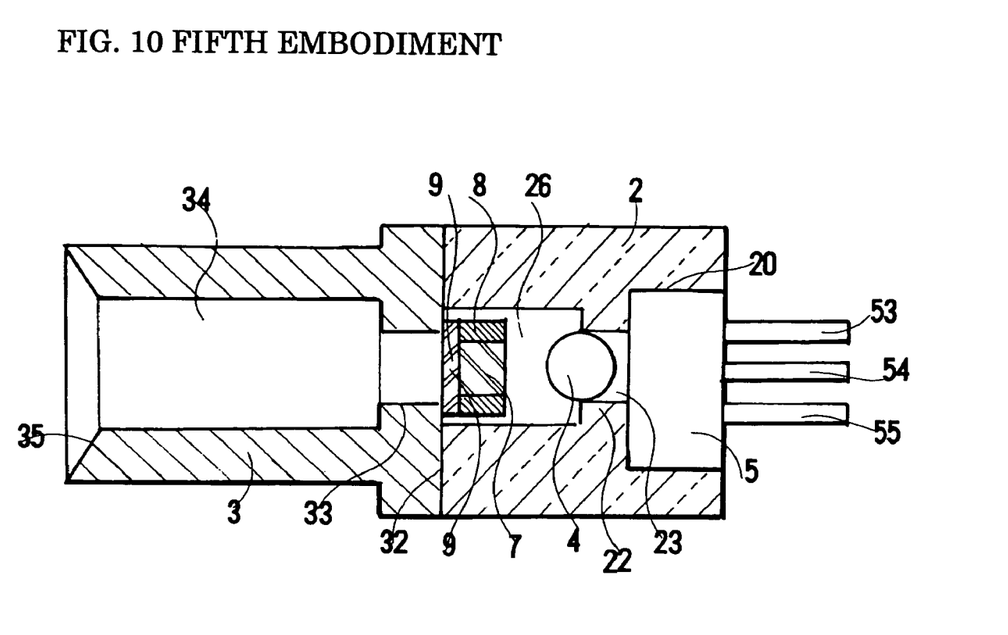
FIG. 10 is a longitudinal sectional view of an optical module in a fifth embodiment of the present invention, in which the backreflection from the far end of the optical fiber is suppressed by placing a polarizer, a permanent magnet, and a Faraday rotator at a receptacle so that the Faraday rotator and the polarizer can intervene in this order between (a) a combination of an optical device and a lens and (b) an optical fiber.

Combination of Sheet Polarizer, Faraday Rotator, and Permanent Magnet, for Far-end Reflection An optical module in a fifth embodiment of the present invention is described below by referring to FIG. 10. The optical modules described above mainly aim at the backreflection from the near end face (near end) of the fiber. Consequently, they are designed to prevent the near-end-reflected light from returning to the laser diode. The optical module described below aims at the light reflected from the opposite end face (far end) of the optical fiber. In this case, it should be considered that the direction of the polarization of the back-reflection light is randomly oriented. Therefore, it is necessary to employ an approach different from that for preventing the near-end-reflected light from returning.

The optical module in the fifth embodiment has a Faraday rotator and a sheet polarizer whose positional relationship is opposite to that employed in the third embodiment. The optical module in the fifth embodiment comprises a cylindrical holder 2 having a cavity, a cylindrical receptacle 3 adjacent to the holder 2, an optical device 5 housed in the holder 2, a sheet polarizer 9 fixed on the rear face 32 of the receptacle 3, and a Faraday rotator 7 and a permanent magnet 8 both fixed on the sheet polarizer 9.

When viewed from the optical device 5, whereas the third embodiment arranges the sheet polarizer 9 and the Faraday rotator 7 in this order, the fifth embodiment arranges the Faraday rotator 7 and the sheet polarizer 9 in this order. The system is designed such that when the rotation angle of the Faraday rotator 7 is added to the direction of the polarization of the sheet polarizer 9, the resulting direction forms an angle of 90 degrees with the direction of the polarization of the light emitted from the optical device (laser diode) 5. This design aims at the light reflected from the far end of the fiber. The direction of the polarization of the light reflected from the near end of the fiber is determined uniquely, because the reflection from the near end does not rotate the plane of polarization.

On the other hand, when the light having entered the fiber travels along the optical fiber and then exits from the other end face (far end), part of the light is reflected from that end face. This reflection is referred to as the far-end reflection in this explanation. The plane of polarization is sometimes rotated in the fiber due to the distortion or nonuniformity of the fiber. Consequently, it should be considered that when the light returns to the optical module, the plane of polarization is not determined uniquely, i.e., the plane of polarization is randomly oriented. When the laser diode is used as the optical device, it emits light polarized in a direction perpendicular to the chip face. Light polarized in parallel to the chip face is extremely weak. After the backreflection light passes through the sheet polarizer 9, it becomes linearly polarized light having a plane of polarization oriented in a certain direction. The plane of polarization is rotated with the Faraday rotator 7 such that the rotated plane of polarization is parallel to the chip.

The linearly polarized light that is emitted from the laser diode 5 and that has a plane of polarization, $\Upsilon$, in a direction perpendicular to the chip face is rotated by the Faraday rotator 7 such that its plane of polarization is rotated by an amount of $\Phi$ (i.e., $\Upsilon+\Phi$). The transmitting direction of the sheet polarizer is adjusted so as to coincide with the rotated plane of polarization (i.e., $\Upsilon+\Phi=\Xi$). Then, most of the light emitted from the laser diode passes through the Faraday rotator 7 and the sheet polarizer. The light enters the fiber and travels over the fiber. Part of it is reflected from the far end and travels over the fiber again in the backward direction to return.

The returning light exits from the near end of the fiber and enters a free space. At this moment, it is assumed that the direction of polarization is randomly oriented. Then, the light enters the sheet polarizer 9. The light having a plane of polarization in the direction of the transmitting direction ($\Xi$) of the sheet polarizer 9 passes through the sheet polarizer 9. It enters the Faraday rotator 7. The 45-degree plane of polarization is similarly rotated by an amount of $\Phi$ (i.e., $\Xi+\Phi$). In the case where the laser diode emits linearly polarized light, it is most suitable that the plane of polarization ($\Xi+\Phi$) be oriented in a direction parallel to the chip face of the laser diode (i.e., $\Xi+\Phi=\Upsilon+90$ degrees). In this case, the plane of polarization is orthogonal to the linearly polarized light of the laser diode, having almost no coupling with the stimulated emission light of the laser diode. As a result, the returning light due to the far-end reflection does not cause the operation unstability of the laser diode. In the above instance, $\Phi=45$ degrees is obtained.

The sheet polarizer uniquely determines the direction of the polarization of the far-end-reflected light. The Faraday rotator directs the plane of polarization to a direction having no relation with the lasing operation of the laser diode. In the first embodiment, it is described that it is desirable that the plane of polarization of the returning light form an angle of 22.5 degrees with the chip face of the laser diode. The reason is that depending on the type, the laser diode sometimes has a slight component of polarized light in a direction parallel to the chip face. With such a laser diode, $2\Phi=45$ degrees is obtained. Therefore, the Faraday rotation angle is 22.5 degrees.

More generally, in the case where the plane of polarization has a difference of ±20 to ±160 degrees when the light has returned to the laser diode, the returning light has almost no coupling with the lasing light of the laser diode. Therefore, the desirable Faraday rotation angle $\Phi$ is 10 to 80 degrees.

SIXTH EMBODIMENT

Figure 11:
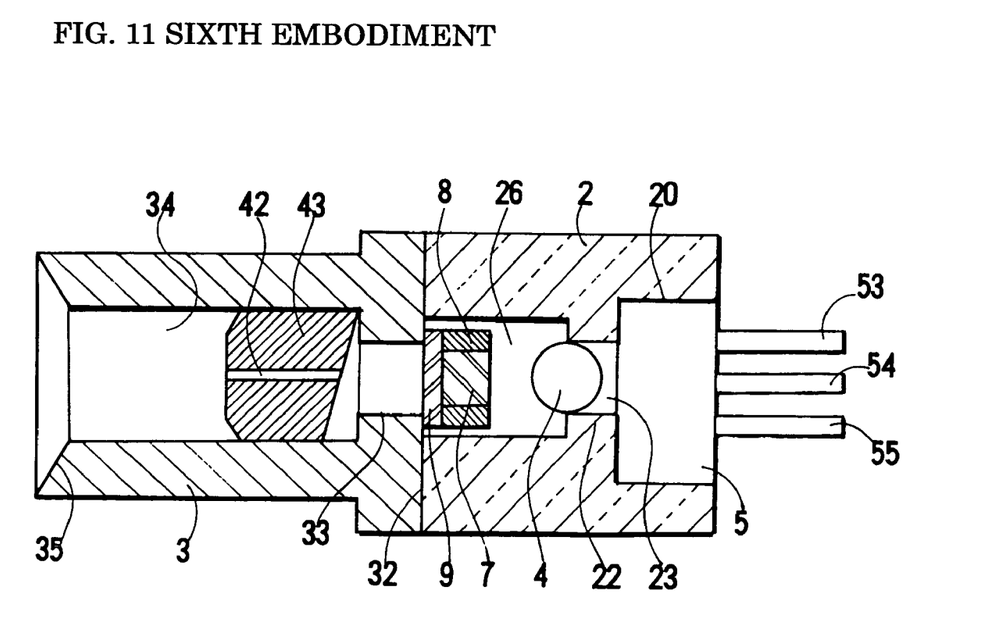
FIG. 11 is a longitudinal sectional view of an optical module in a sixth embodiment of the present invention, in which the backreflection from the far end of the optical fiber is suppressed by placing a polarizer, a permanent magnet and a Faraday rotator at a receptacle so that the Faraday rotator and the polarizer can intervene between (a) a combination of an optical device and a lens and (b) an optical fiber and in which backreflection is suppressed by the reflection from an oblique end face that is provided by placing an obliquely cut fiber stub in the receptacle.

Combination of Sheet Polarizer, Faraday Rotator, Permanent Magnet, and Fiber Stub An optical module in a sixth embodiment of the present invention is described below by referring to FIG. 11. In this embodiment, a fiber stub, which is not used in the first to fifth embodiments, is press-fitted into the receptacle. Except that, the optical module in this embodiment has the same structure as that in the fifth embodiment. A fiber stub 43 into which a dummy fiber 42 is inserted has an optical-device-side face that is obliquely cut and polished. The fiber stub 43 is press-fitted into a ferrule-holding hole 34 of a receptacle 3 so as to be positioned at the optical-device-side portion in the hole. The portion behind the fiber stub 43 in the ferrule-holding hole 34 is formed so that the ferrule 47 as shown in FIG. 12 can be attached on a detachable basis.

In the prior-art example shown in FIG. 5, nothing exists between the fiber stub 77 and the lens 74. On the other hand, the sixth embodiment places in that space a sheet polarizer 9, a Faraday rotator 7, and a permanent magnet 8. This embodiment doubly prevents the backreflection both by the oblique reflection from the obliquely cut face of the fiber stub 43 and by the rotation of the plane of polarization by means of the Faraday rotator 7. In order to more strictly prevent the backreflection, it is desirable to combine a Faraday rotator and a fiber stub as in this embodiment, although the pressure-fitting step must be incorporated and the high centering precision is required.

SEVENTH EMBODIMENT

Combination of Joint Holder Having Obliquely Cut Groove and Acting-as-optical Isolator Functional Device An optical module in a seventh embodiment is classified as one type of module in which a joint holder is placed between a lens holder and a receptacle. The module in this embodiment is achieved by applying the concept of the present invention to this type. The optical modules described up to the sixth embodiment are classified as another type of module in which a receptacle is placed next to a holder. In this type, consequently, an acting-as-optical isolator functional device is placed at a light-passing hole of the receptacle. The optical module described below uses a receptacle that is produced as a separate member. Consequently, the portion corresponding to the light-passing hole of the receptacle can be independently processed. By effectively utilizing the flexibility of the processing, the acting-as-optical isolator functional device is housed obliquely.

Figure 13:
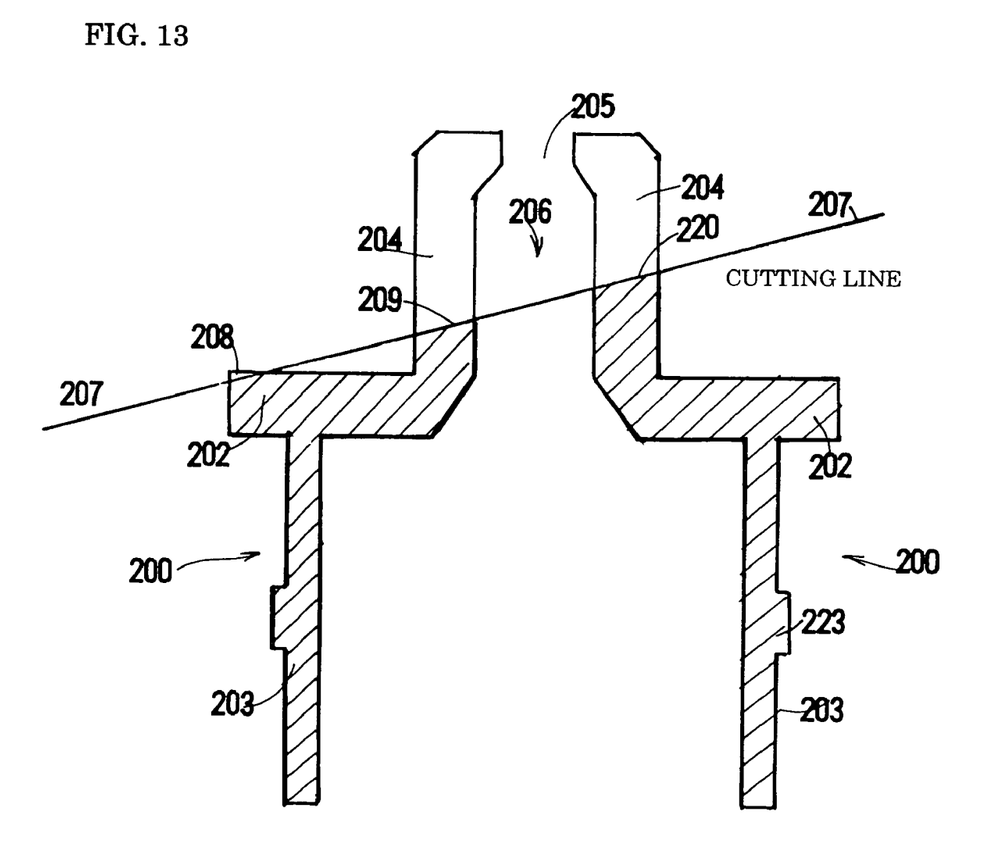
FIG. 13 is a vertical sectional view of a joint holder to be used in a seventh embodiment of the present invention, in which an obliquely cut groove is formed from its head portion to its shoulder portion.
Figure 14:
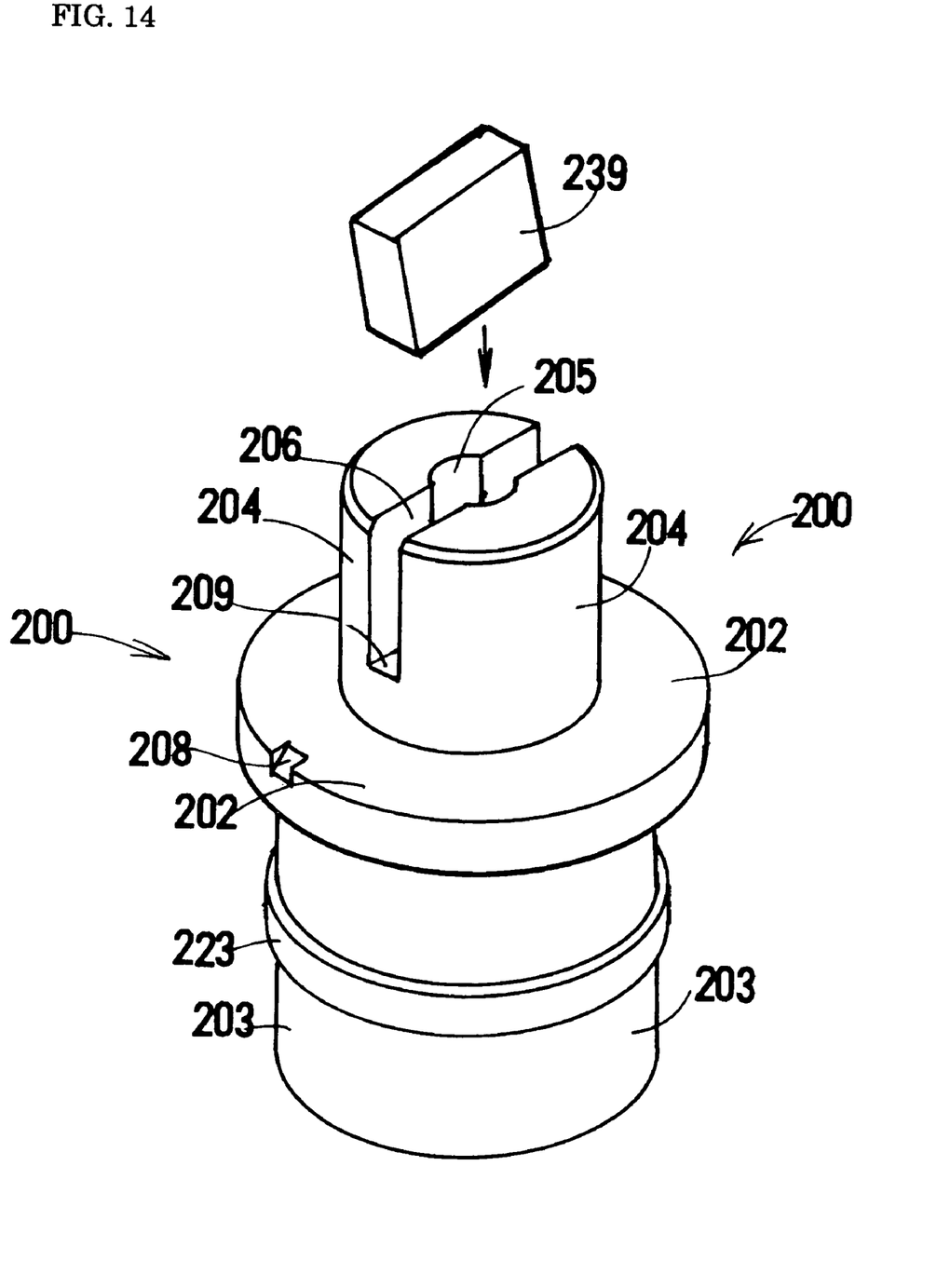
FIG. 14 is a perspective view of a joint holder to be used in the seventh embodiment of the present invention, the joint holder being provided with an obliquely cut groove formed from its head portion to its shoulder portion, the joint holder being in a state immediately before an acting-as-optical isolator functional device is inserted into the cut groove.

FIG. 13 is a vertical sectional view of a joint holder 200, and FIG. 14 is a perspective view of it. The joint holder 200 is a metallic member and has a cylindrical joint holder shoulder portion 202, a smaller-diameter cylindrical barrel portion 203 extending downward from the shoulder portion 202, and a small-diameter head portion 204 extending upward from the joint holder shoulder portion 202. The head portion 204 is provided with a vertical light-passing hole 205. A lens holder is to be inserted into the barrel portion 203 of the joint holder 200. After the vertical position of the joint holder is adjusted (centering in a vertical direction), the lens holder is to be welded to the joint holder. A receptacle is to be welded on the joint holder shoulder portion 202. The receptacle is welded to the shoulder portion 202 after its horizontal position is adjusted (centering in a horizontal direction). The head portion 204 of the joint holder 200 is provided with a narrow cut-out that includes the center line of the head portion 204. The cut-out is machined such that its bottom line is formed by the cutting line 207 as shown in FIG. 13.

A groove having a certain width is formed obliquely from the top face of the head portion. The reason for the oblique cutting is that an acting-as-optical isolator functional device is to be inserted into the groove obliquely. The cylindrical portion of the head portion 204 is cut such that a deeper groove 209 is formed at the left-hand portion of the cylinder shown in FIG. 13 and a shallower groove 220 is formed at the right-hand portion of the cylinder. Part of the left-hand portion of the shoulder portion 202 is cut with the same cutting tool. This cut portion is used as a marker 208. The marker 208 formed at the periphery of the shoulder portion remains exposed even after the receptacle is placed. Consequently, the marker 208 has a function of showing the direction of the place where the acting-as-optical isolator functional device is mounted. Thus, a cut groove having a certain width, a predetermined angle, and an intended depth is formed to provide a cut-out 206 having proper dimensions at the head portion. The foregoing cutting operation is much easier than the cutting operation of the head portion with a slight inclination close to the horizontal line.

An acting-as-optical isolator functional device 239 having the shape of a rectangular solid is inserted into the cut-out formed through the above-described method. The acting-as-optical isolator functional device may either be a device composed of a Faraday rotator (FR) and a permanent magnet or be a self-magnetized-type Faraday rotator (FR). Furthermore, it may be composed of a Faraday rotator, a permanent magnet, and a sheet polarizer. Still furthermore, it may be composed of a self-magnetized-type Faraday rotator and a sheet polarizer. Still furthermore, it may have a sheet polarizer at its both sides, i.e., it may have a constitution of a sheet polarizer, a self-magnetized-type Faraday rotator, and another sheet polarizer in this order.

Figure 15:
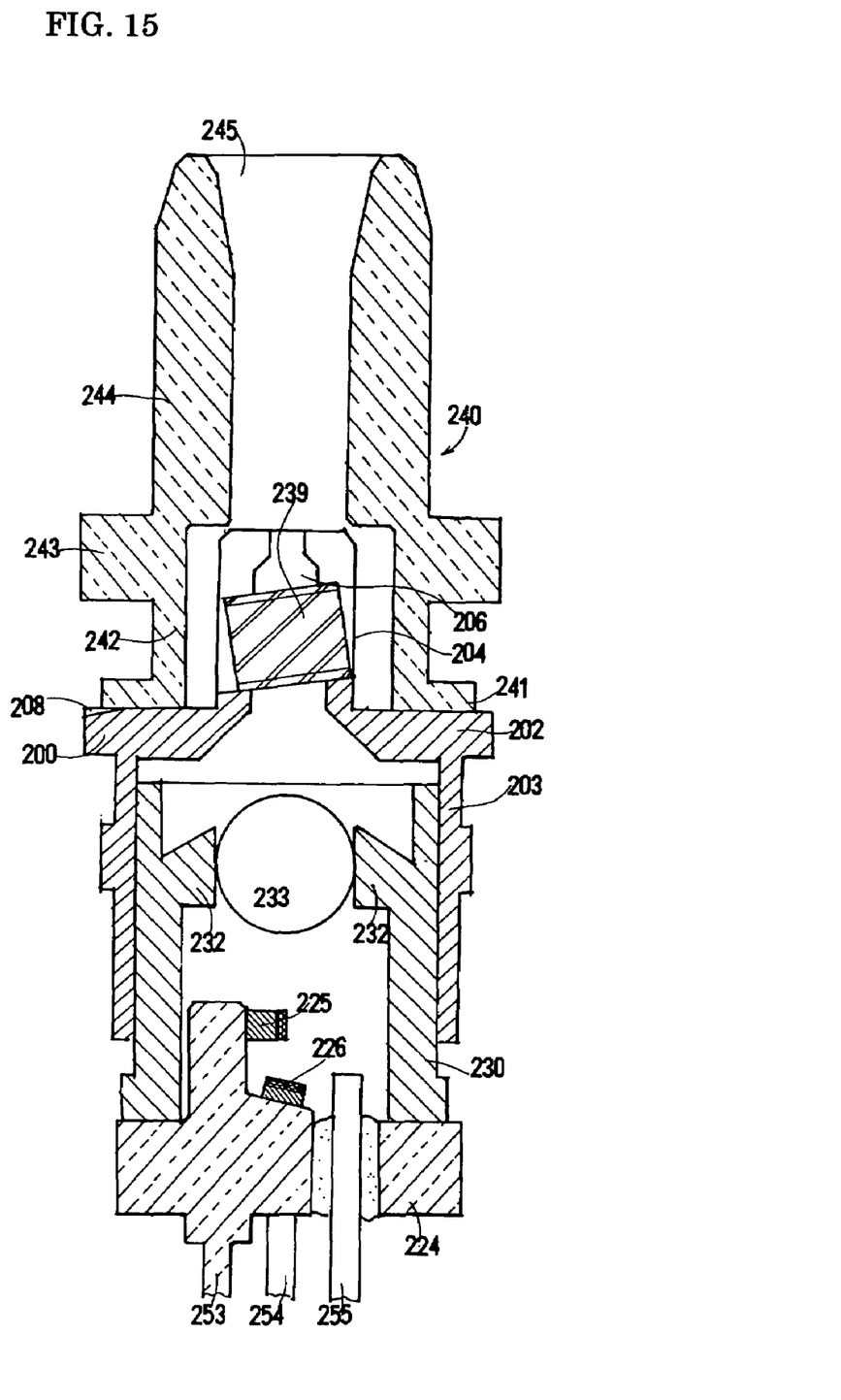
FIG. 15 is a vertical sectional view of an optical module having an obliquely placed acting-as-optical isolator functional device in the seventh embodiment of the present invention, the optical module comprising (a) a joint holder provided with an obliquely cut groove formed from its head portion to its shoulder portion, (b) an acting-as-optical isolator functional device inserted into the cut groove, (c) a receptacle welded to the joint holder, and (d) a lens holder welded to the joint holder.

FIG. 15 is a vertical sectional view of an entire optical module that is formed by assembling a joint holder 200 whose cut-out portion houses an acting-as-optical isolator functional device 239, a lens holder 230, and a receptacle 240. A circular-disk-shaped stem 224 is provided with a pole on the side face of which a laser diode (LD) 225 is mounted. The laser diode emits light both upward and downward. A monitoring PD 226 for monitoring the downward light is mounted on the surface of the stem. The stem 224 has lead pins 253, 254, and 255. The cylindrical lens holder 230 has a lens-holding protrusion 232 at the upper portion in it to hold a spherical lens 233. The foot portion of the lens holder 230 is welded to the top face of the stem 224. The outer circumferential surface of the lens holder 230 is in contact with the inner circumferential surface of the barrel portion 203 of the above-described joint holder 200 to be welded and fixed with each other.

A foot portion 241 of the cylindrical receptacle 240 is welded to the top face of the shoulder portion 202 of the joint holder 200. The above-described head portion of the joint holder is positioned in the space provided at the inside of a protrusion 243 of the receptacle 240. A ferrule (not shown) holding the end portion of an optical fiber is inserted from an inlet for ferrule insertion 245 to be held by a barrel portion 244. The front end of the ferrule comes to a standstill at the head portion 204 of the joint holder. The upward light of the LD 225 is gathered by the lens 233 and passes through the acting-as-optical isolator functional device 239 obliquely to enter the end of the optical fiber (not shown). Part of the light may be reflected from the end of the optical fiber. Part of the light having entered the optical fiber may also be reflected from the far end of the optical fiber. Such reflected light arrives at the top face of the acting-as-optical isolator functional device 239. However, having a function of an optical isolator, the acting-as-optical isolator functional device 239 prevents the reflected light from returning to the LD 225.

The types of the acting-as-optical isolator functional device include (a) a combination of a Faraday rotator, a sheet polarizer, and a permanent magnet, (b) a self-magnetized-type Faraday rotator, and (c) a combination of a self-magnetized-type Faraday rotator and a sheet polarizer. Because the acting-as-optical isolator functional device can be produced as a small device, it can be obliquely inserted into the cut-out 206. Because it is obliquely positioned, the light is reflected from the end face in a slanting direction. As a result, the backreflection can be eliminated more thoroughly. Because the marker 208 is provided on the shoulder portion along the cutting line 207, it serves as a marker for easy recognition.

What is claimed is:

1. An optical module comprising:
    (a) a holder that houses an optical device selected from the group consisting of a light-emitting device and a photodetection device;
    (b) a condenser lens that is fixed in the interior of the holder and that optically couples an outside optical fiber and the optical device;
    (c) a receptacle that:
    (c1) is provided with a ferrule-holding hole for holding on a detachable basis a ferrule to which the outside optical fiber is fixed;
    (c2) is provided with a light-passing hole at its end portion; and
    (c3) is bonded with the holder at its end face in the direction of the axis;
    (d) a Faraday rotator that is fixed at one place selected from the group consisting of the inside of the light-passing hole of the receptacle and the end face of the receptacle; and
    (e) a permanent magnet for giving a flux density, B, to the Faraday rotator in the direction of the axis,
    wherein the receptacle is bonded with the holder so as to be displaced in a direction perpendicular to the axial line, so that an imaginary line connecting the lens and the Faraday rotator is slanted to the center line of the holder.

2. An optical module as defined by claim 1, the optical module further comprising a sheet polarizer fixed at the optical-device-side face of the Faraday rotator.

3. An optical module as defined by claim 1, the optical module further comprising a sheet polarizer fixed at the receptacle-side face of the Faraday rotator.

4. An optical module comprising:
    (a) a stem mounting on it an optical device selected from the group consisting of a light-emitting device and a photodetection device;
    (b) a lens holder fixed to the stem;
    (c) a condenser lens that is fixed in the lens holder and that optically couples an outside optical fiber and the optical device;
    (d) a joint holder that has a head portion provided with a through hole and with a cut-out portion formed by obliquely cutting the head portion, a shoulder portion, and a barrel portion and that is fixed to the lens holder at the barrel portion;
    (e) an acting-as-optical isolator functional device that is inserted into the cut-out portion of the joint holder and that blocks backreflection light; and
    (f) a receptacle that is capable of holding on a detachable basis a ferrule securely holding an outside optical fiber and that is fixed on the shoulder portion of the joint holder,
    wherein the acting-as-optical isolator functional device obliquely placed in the joint holder is a self-magnetized-type Faraday rotator.

5. An optical module as defined by claim 4, wherein the shoulder portion of the joint holder is provided with a marker for indicating the direction of the acting-as-optical isolator functional device.

6. An optical module comprising:
(a) a stem mounting on it an optical device selected from the group consisting of a light-emitting device and a photodetection device;
(b) a lens holder fixed to the stem;
(c) a condenser lens that is fixed in the lens holder and that optically couples an outside optical fiber and the optical device;
(d) a joint holder that has a head portion provided with a through hole and with a cut-out portion formed by obliquely cutting the head portion, a shoulder portion, and a barrel portion and that is fixed to the lens holder at the barrel portion;
(e) an acting-as-optical isolator functional device that is inserted into the cut-out portion of the joint holder and that blocks backreflection light; and
(f) a receptacle that is capable of holding on a detachable basis a ferrule securely holding an outside optical fiber and that is fixed on the shoulder portion of the joint holder,
wherein the acting-as-optical isolator functional device obliquely placed in the joint holder is composed of a sheet polarizer and a self-magnetized-type Faraday rotator.

7. An optical module comprising:
(a) a holder that houses an optical device selected from the group consisting of a light-emitting device and a photodetection device;
(b) a condenser lens that is fixed in the interior of the holder and that optically couples an outside optical fiber and the optical device;
(c) a receptacle that:
(c1) is provided with a ferrule-holding hole for holding on a detachable basis a ferrule to which the outside optical fiber is fixed;
(c2) is provided with a light-passing hole at its end portion; and
(c3) is bonded with the holder at its end face in the direction of the axis; and
(d) a self-magnetized-type Faraday rotator that is fixed at one place selected from the group consisting of the inside of the light-passing hole of the receptacle and the end face of the receptacle,
wherein the receptacle is bonded with the holder so as to be displaced in a direction perpendicular to the axial line, so that an imaginary line connecting the lens and the Faraday rotator is slanted to the center line of the holder.

8. An optical module as defined by claim 7, the optical module further comprising a sheet polarizer fixed at the optical-device-side face of the Faraday rotator.

9. An optical module as defined by claim 7, the optical module further comprising a sheet polarizer fixed at the receptacle-side face of the Faraday rotator.

10. An optical module as defined by claim 6 wherein the shoulder portion of the joint holder is provided with a marker for indicating the direction of the acting-as-optical isolator functional device.

* * * * *